(No Model.)
J. PROEGER.
APPARATUS FOR FORMING GLASS ARTICLES.
No. 566,469. Patented Aug. 25, 1896.
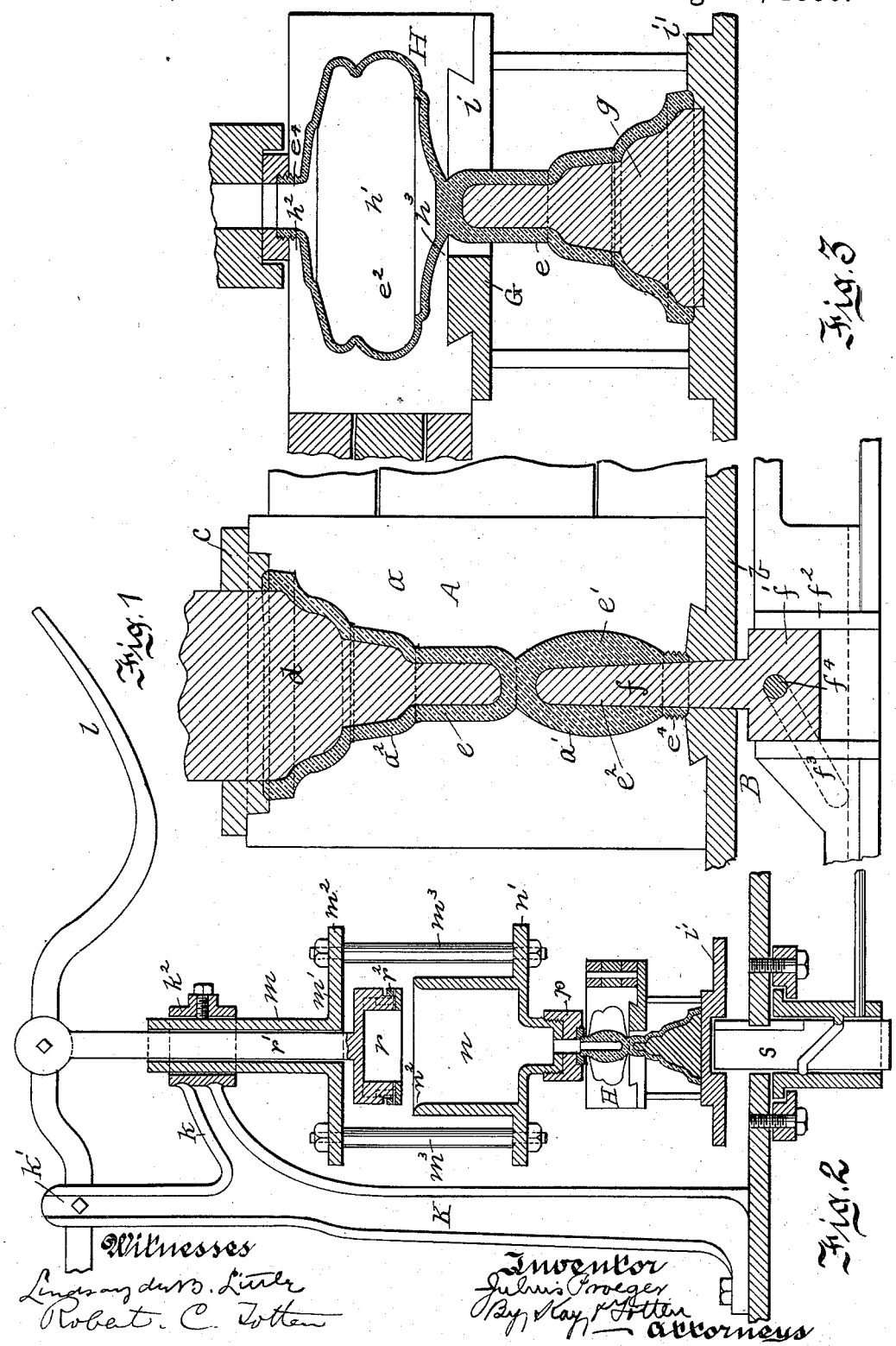

UNITED STATES PATENT OFFICE.

JULIUS PROEGER, OF GREENSBURG, PENNSYLVANIA.

APPARATUS FOR FORMING GLASS ARTICLES.

SPECIFICATION forming part of Letters Patent No. 566,469, dated August 25, 1896.

Application filed April 15, 1895. Serial No. 545,793. (No model.)

*To all whom it may concern:*

Be it known that I, JULIUS PROEGER, a resident of Greensburg, in the county of Westmoreland and State of Pennsylvania, have invented a new and useful Improvement in Apparatus for Forming Glass Articles; and I do hereby declare the following to be a full, clear, and exact description thereof.

My invention relates to the manufacture of hollow blown glassware, its object being to devise apparatus for forming articles having pressed bases or stands and blown body portions, as well as to improve the apparatus for forming the same.

My invention comprises certain details of construction, all of which will be fully hereinafter set forth and claimed.

To enable others skilled in the art to practice my invention, I will describe the same more fully, referring to the accompanying drawings, in which—

Figure 1 is a longitudinal section of the press-mold in which the blank is originally pressed. Fig. 2 is a longitudinal section of the blowing apparatus and the blow-mold, showing the blank in position ready to be blown to finished shape; and Fig. 3 is an enlarged view of the blow-mold, showing the finished blank blown to shape.

Like letters of reference indicate like parts in each.

My invention is illustrated in connection with the making of glass lamps, the invention having been applied in the formation of such an article and being well illustrated thereby, though it is to be understood that it includes the formation of any article having pressed bases or stands, that is, one hollow end portion thereof pressed to shape and the other portion blown to shape from a pressed blank formed with the pressed base or stand. The article is pressed within a press-mold such as that shown in Fig. 1, the mold A, having the body portion $a$, generally formed in two halves and hinged together, a half section of which is shown in the drawings as the section is taken through the dividing-line of the mold. These sections rest upon the base $b$, which is supported upon the table B, and resting upon the mold-body is the mold-ring $c$, through which the plunger $d$ enters to compress the blank within the mold. The peculiarity of this mold is found in the fact that it forms a deep hollow portion at each end of the blank. For example, in the formation of the blanks such as shown the pressed blank is formed with a base or stand portion $e$ of the lamp-body uppermost in the mold and of considerable length, so as to form a proper shape and configuration of the base or stand, and below the same the portion $e'$ of the blank which is to be subsequently blown to form the bowl of the finished article, and which I will hereinafter term a "bowl-blank," having a deep cavity formed therein, as at $e^2$. To accomplish this I form the plunger $d$ of shape corresponding to the inner surface of the hollow stand $e$, so that that stand is pressed to finished shape in the pressing operation, and I also provide what I term a "punty," namely, a reciprocating conical block $f$, which rises within the base $a'$ of the mold-cavity within which the bowl-blank $e'$ is pressed and around which the glass is pressed by the action of the plunger when it enters the upper portion $a^2$ of the mold-cavity within which the base or stand is placed. This punty $f$ is supported on the reciprocating block $f'$ of the table B and rises through an opening in said table and through the base $b$ of the press-mold. The punty $f$ and its block $f'$ are raised and lowered by a ring $f^2$, standing on the bottom of the table B, a suitable groove $f^3$ being formed in that ring, as shown by dotted lines, and a pin $f^4$ in the block $f'$, as indicated by dotted lines, so providing for the raising and lowering of the punty.

It will be noticed that the neck portion $c^4$ of the bowl-blank is pressed to shape during the pressing of the blank, and any screw-thread or like formation for the holding of the lamp-socket may be formed thereon.

In the formation of the blank in the mold above described, after the parts are assembled and the glass is dropped within the mold-cavity, the punty $f$ having been raised therein, the plunger $d$ is forced downwardly into the position shown in Fig. 1, which compresses the blank within the mold-cavity, forming the blank having the base or stand portion $e$ and the bowl-blank $e'$. This blank is then removed from that mold and placed within the blow-mold while it is still sufficiently heated and in condition for blowing.

I will now describe the blowing apparatus, so that that step in the method may be more fully understood.

The blank is preferably supported during the blowing operation by a support $g$, which enters within the stand portion $e$ of the blank and conforms substantially to the same, or at least conforms to the upper part thereof, and serves the double purpose of holding the blank in position for blowing and resisting the downward pressure on the lower portion of the bowl-blank during the blowing operation. In connection with this stand G, I employ the blow-mold H, which is supported on a suitable frame $i$, resting on the base-plate $i'$, and is adapted to fit around the bowl portion $e^2$ and above the stand portion $e$ thereof. The blow-mold is hinged in the ordinary way and is formed with the bowl-cavity $h'$ conforming to the shape of the finished mold, and it fits closely to the bowl-blank $e'$ at the top and bottom of the blow-mold, such as at $h^2$ $h^3$, encircling the neck $e^4$ of the blank and the base of the bowl portion thereof. When so arranged within the mold, the blank is ready for blowing, being supported from downward movement by the support $g$, and its blown portion being inclosed within the blow-mold H.

As so arranged any suitable blowing apparatus may be connected to the blow-mold and the bowl portion of the blank expanded by fluid-pressure within the blow-mold. I have illustrated a suitable form of blowing apparatus which can be operated by hand and has the advantage that it is under the control of the operator and the desired pressure of air can be generated by him without applying too great force, the necessary pressure being indicated to the operator by the resistance, the operator becoming quickly accustomed to the pressure of the mold. Said blowing apparatus is supported on the standard K, which has extending out therefrom the bracket $k$, the standard extending above the bracket and forming the pivot or fulcrum $k'$ for the hand-lever $l$.

Supported on the bracket or arm $k$ is the body portion of the blowing apparatus, which, as shown in the drawings, consists of the tube or sleeve $m$, secured within the socket $k^2$ at the end of the bracket $k$ and depending below the same, said tube $m$ carrying the plate or flange $m'$, extending out therefrom, and below said plate or flange is the cylinder-body $n$, the plate $m'$, having the lugs $m^2$, while the cylinder-body has like lugs $n'$, and the two are connected by the vertical tie-rods $m^3$, the cylinder being thus hung from the tube $m$.

Below the cylinder $n$ is the mouthpiece $p$ of the blowing apparatus, which is adapted to form a joint with the blow-mold or article therein, fitting over the same, and in the preferred construction the blow-mold containing the article being raised against such mouthpiece. The interior of the cylinder $n$ of course communicates with the mouthpiece, so that the air compressed within the cylinder will be forced through such mouthpiece into the blow-mold. To compress the air, I employ the piston $r$, which is carried on the piston-rod $r'$, passing up through and guided in its movement by the tube $m$, supported by the bracket $k$, the piston-rod having any suitable connection with the hand-lever $l$. The piston $r$ is adapted to enter within the cylinder $n$ and has suitable packing, as at $r^2$, to form an air-tight joint with the interior thereof, and the upper end of the cylinder $n$ is preferably made flaring, as at $n^2$, so that the piston will enter the same easily.

It is evident that when the piston enters the cylinder, as there is no escape for the air within the cylinder and as the piston is forced downwardly, the air must pass from the mouthpiece into the blow-mold and act upon the article contained therein.

This simple form of blowing apparatus is found efficient for the purpose, and the operator will quickly become accustomed to the pressure necessary to be exerted upon the article and the great objection to blowing by air compressed in a compressing-plant when the proper control is not easily obtained is overcome, while the expense of such plant is done away with.

In the formation of the lamp above described the blank is first pressed to shape in a mold such as shown in Fig. 1. The punty is then withdrawn and the mold is opened, and by any suitable tool the operator inverts the blank and places it over the interior support $g$, and he then places said support on the base-plate $i'$ of the blow-mold, standing it thereon and within the frame $i$, and then closes the blow-mold around the same and the apparatus is ready for the blowing operation.

It is preferred that a suitable reciprocating block $s$ be employed on the table supporting the blowing apparatus to force the blow-mold into contact with the blowing apparatus; but this is not necessary, as the main frame of the blowing apparatus containing the cylinder $n$ may be lowered down into the blow-mold or the parts operated in any suitable way. For example, the piston $r$ may be held stationary and the blow-mold raised against the mouthpiece $p$ and by suitable mechanism forced upwardly, so as to force the cylinder $n$ of the blowing apparatus around the piston.

When the apparatus shown in the drawings is employed, the blow-mold having been raised into contact with the mouthpiece $p$, the operator simply grasps the handle $l$ and forces it downwardly, forcing the piston $r$ into the cylinder $n$ and compressing the air therein and forcing it through the mouthpiece into the blow-mold, which action expands the bowl-blank $e^2$, as shown in Fig. 3, forcing it to conform to the walls of the mold-cavity $h'$ of the blow-mold, and so forming the completed blown-bowl portion and completing the article. In this way I am enabled to produce a combined pressed and blown article having a long hollow base or stand pressed to shape and a body portion blown to shape, the two being formed of the same body of glass, the pressed blank being easily and quickly blown to shape and the expense of producing the article very materially reduced.

The apparatus is simple in construction, and the necessity for a separate blowing-plant is entirely overcome.

What I claim as my invention, and desire to secure by Letters Patent, is—

1. The combination with a blow-mold, of a blowing apparatus formed of a bracket supporting a tube, the tube, a cup-cylinder hung from said tube and an opening upwardly, and a piston above the cup-cylinder adapted to enter the same and having a piston-rod extending through the tube supporting the cylinder, substantially as set forth.

2. The combination with a blow-mold, of a blowing apparatus formed of a bracket supporting a tube, the tube, a stationary cup-cylinder hung from said tube and an opening upwardly, and a piston above the cup-cylinder adapted to enter the same and having a piston-rod extending through the tube supporting the cylinder, and a hand-lever connected to such piston-rod, substantially as set forth.

3. The combination with a blow-mold, of the bracket $k$, the tube $m$ supported within the bracket and having the base-plate $m'$, the cup-cylinder $n$ carrying the mouthpiece $p$ at the base thereof, and connected to the plate $m'$ by the tie-rods $m^3$, and a piston $r$ mounted within the tube $m$ and adapted to enter the cup-cylinder, substantially as set forth.

In testimony whereof I, the said JULIUS PROEGER, have hereunto set my hand.

JULIUS PROEGER.

Witnesses:
JAMES I. KAY,
ROBERT C. TOTTEN.